(12) United States Patent
Yoshinaka et al.

(10) Patent No.: US 6,250,678 B1
(45) Date of Patent: Jun. 26, 2001

(54) SUPPORTING STRUCTURE FOR INSTRUMENT PANEL OF MOTOR VEHICLE

(75) Inventors: Katsunori Yoshinaka; Hidenori Baba, both of Kawagoe (JP)

(73) Assignee: Moriroku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/406,776

(22) Filed: Sep. 28, 1999

(30) Foreign Application Priority Data

Oct. 7, 1998 (JP) .................................................. 10-284964

(51) Int. Cl.[7] .................................................. B60R 21/045
(52) U.S. Cl. .............................. 280/752; 180/90; 296/189
(58) Field of Search ................................. 280/751, 752; 180/90; 296/189, 190.09, 70, 208; 454/143, 152, 127

(56) References Cited

U.S. PATENT DOCUMENTS

| 3,831,705 | * | 8/1974 | Glance | 180/90 |
| 3,861,486 | * | 1/1975 | Wilfert | 180/90 |
| 3,924,707 | * | 12/1975 | Renner et al. | 180/90 |
| 4,123,085 | * | 10/1978 | Oda et al. | 280/752 |
| 4,223,754 | * | 9/1980 | Mizuno et al. | 180/90 |
| 4,474,391 | * | 10/1984 | Matsuno et al. | 280/752 |
| 5,370,417 | * | 12/1994 | Kelman et al. | 280/751 |
| 5,762,395 | * | 6/1998 | Merrifield et al. | 296/203.01 |
| 6,110,037 | * | 8/2000 | Yoshinaka | 454/143 |
| 6,126,231 | * | 10/2000 | Suzuki et al. | 296/189 |

FOREIGN PATENT DOCUMENTS 9-2104   1/1997   (JP) .

* cited by examiner

*Primary Examiner*—Kenneth R. Rice
*Assistant Examiner*—Lynda Jasmin
(74) *Attorney, Agent, or Firm*—Arent Fox Kintner Plotkin & Kahn

(57) ABSTRACT

In a supporting structure for an instrument panel of a motor vehicle, an energy absorbing member made of a synthetic resin foam is placed between a reinforcing member which is linked to the vehicle body and an instrument panel which is made of a synthetic resin and supported by the reinforcing member, and when the head of an occupant collides with the upper surface of the instrument panel the collision energy is absorbed by destroying foamed cells of the energy absorbing member 9 as the instrument panel is deformed or destroyed. Thus, the impact caused when the head of the occupant collides with the upper surface of the instrument panel can effectively be absorbed while enabling the reinforcing member and the instrument panel to be placed close to each other.

3 Claims, 4 Drawing Sheets

US 6,250,678 B1

SUPPORTING STRUCTURE FOR INSTRUMENT PANEL OF MOTOR VEHICLE

BACKGROUND OF THE INVENTION

1. Field of the Invention

The present invention relates to a supporting structure for the instrument panel of a motor vehicle wherein an instrument panel made from a synthetic resin is supported by a reinforcing member whose opposite ends are linked to the right and left front pillars of the vehicle body.

2. Description of the Prior Art

When the head of an occupant collides with the upper surface of the instrument panel due to an accident in which the vehicle is involved in a collision, in order to prevent a large impact from being applied to the head of the occupant caused by a reinforcing member supporting the instrument panel inhibiting deformation of the instrument panel, a large buffer space for allowing a sufficient level of deformation of the instrument panel is generally formed between the reinforcing member and the instrument panel (see, for example, Japanese Patent Application Laid-Open No. 9-2104).

However, such formation of a large buffer space between the reinforcing member and the instrument panel makes it impossible to place the reinforcing member and the instrument panel close to each other, thus leading to preventing the dimensions of the vehicle interior from being enlarged.

SUMMARY OF THE INVENTION

The present invention has been accomplished in view of the circumstances, and its objective is to provide a supporting structure for an instrument panel of a motor vehicle which enables the reinforcing member and the instrument panel to be placed close to each other and at the same time can effectively absorb an impact when the head of an occupant collides with the upper surface of the instrument panel thus reducing the damage to the occupant as much as possible.

In order to accomplish the above-mentioned objective, according to the first characteristic of the present invention, there is proposed a supporting structure for an instrument panel of a motor vehicle, wherein an instrument panel made of a synthetic resin is supported by a reinforcing member which is linked to a body of the motor vehicle, and wherein an energy absorbing member made of a synthetic resin foam is placed between a reverse surface of the instrument panel and the reinforcing member, and when the head of an occupant collides with the upper surface of the instrument panel the collision energy is absorbed by destroying foamed cells of the aforementioned energy absorbing member as the instrument panel is deformed or destroyed.

In accordance with the above-mentioned first characteristic, when the head of an occupant collides with the upper surface of the instrument panel, the collision energy can be absorbed by destroying foamed cells of the energy absorbing member as the instrument panel is deformed or destroyed. Thus, the impact applied to the occupant can effectively be reduced while enabling the reinforcing member and the instrument panel to be placed close to each other. Moreover, the level of energy which can be absorbed can be controlled by the size of the foamed cells of the energy absorbing member and the thickness and location of the member, and thus its design can be carried out freely.

In addition to the above-mentioned characteristic, the present invention is characterised in that the energy absorbing member comprises a box-shaped air-conditioning duct.

In accordance with the second characteristic of the present invention, since the box-shaped air-conditioning duct functions also as an energy-absorbing member, it is unnecessary to form a special energy-absorbing member and thus the structure can be simplified.

Furthermore, in addition to the above-mentioned characteristics, the third characteristic of the present invention is that on a reverse side of the area of the instrument panel which is expected to receive an intense impact from the head of the occupant there is placed a lengthways wall of the box-shaped duct which rises towards the area from the circumference of the aforementioned reinforcing member.

In accordance with the third characteristic, the impact given by the head of the occupant to the instrument panel is applied to the lengthways wall of the box-shaped duct as a compressive force, and therefore the lengthways wall can absorb an impact energy so high as to make it buckle. In this case, by choosing the thickness and angle of the lengthways wall, the level of energy which can be absorbed can be controlled, and as a result the impact applied to the occupant can effectively be reduced while enabling the reinforcing member and the instrument panel to be placed closer to each other.

The above objectives, other objectives, characteristics and advantages of the present invention will be elucidated by a preferred embodiment described in detail by reference to the attached drawings.

DETAILED DESCRIPTION OF THE PREFERRED EMBODIMENT

Figure 1:
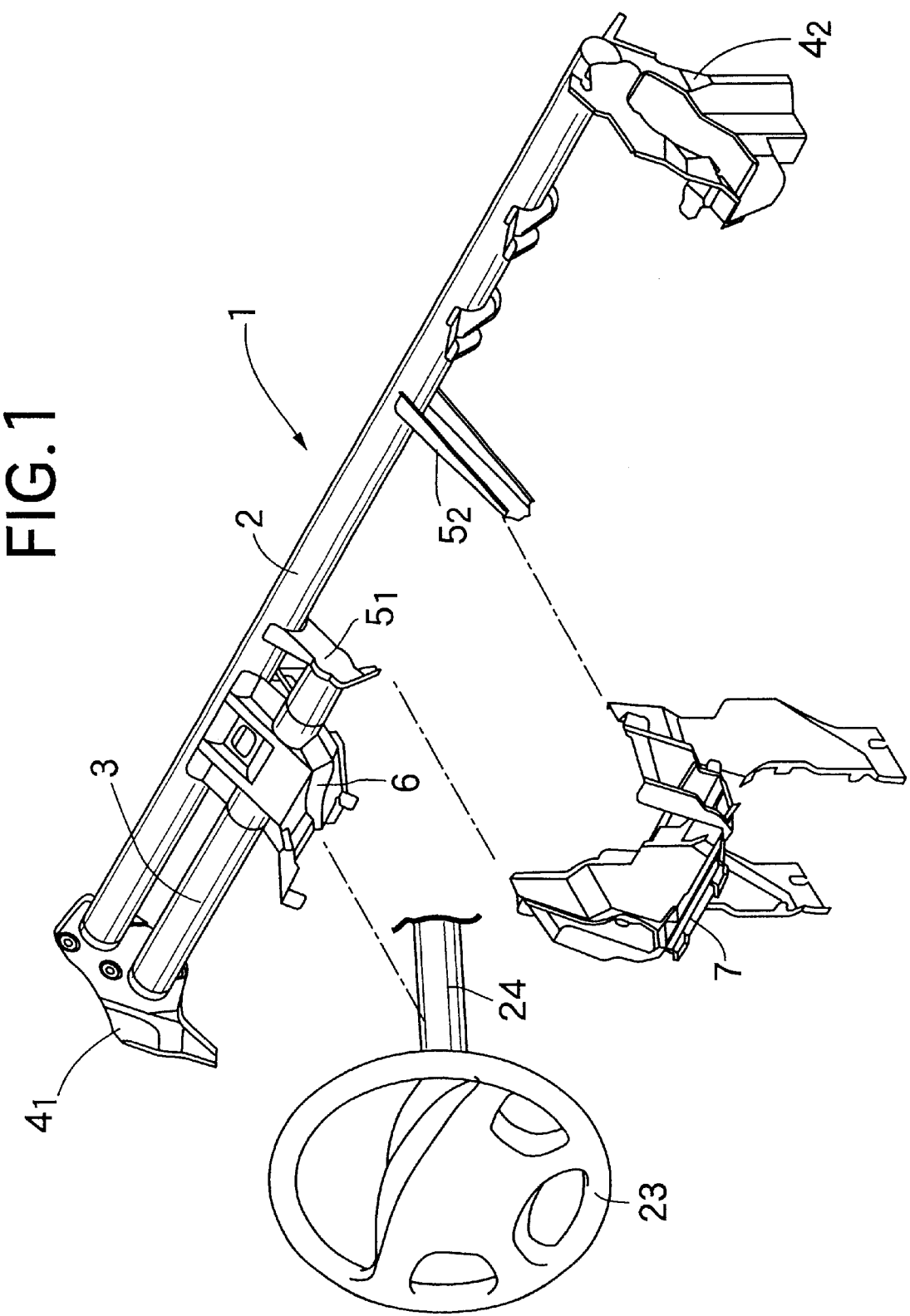
FIG. 1 is a perspective view of a steering hanger member (reinforcing member) which is one element of an assembly for the front interior part of a motor vehicle.
Figure 2:
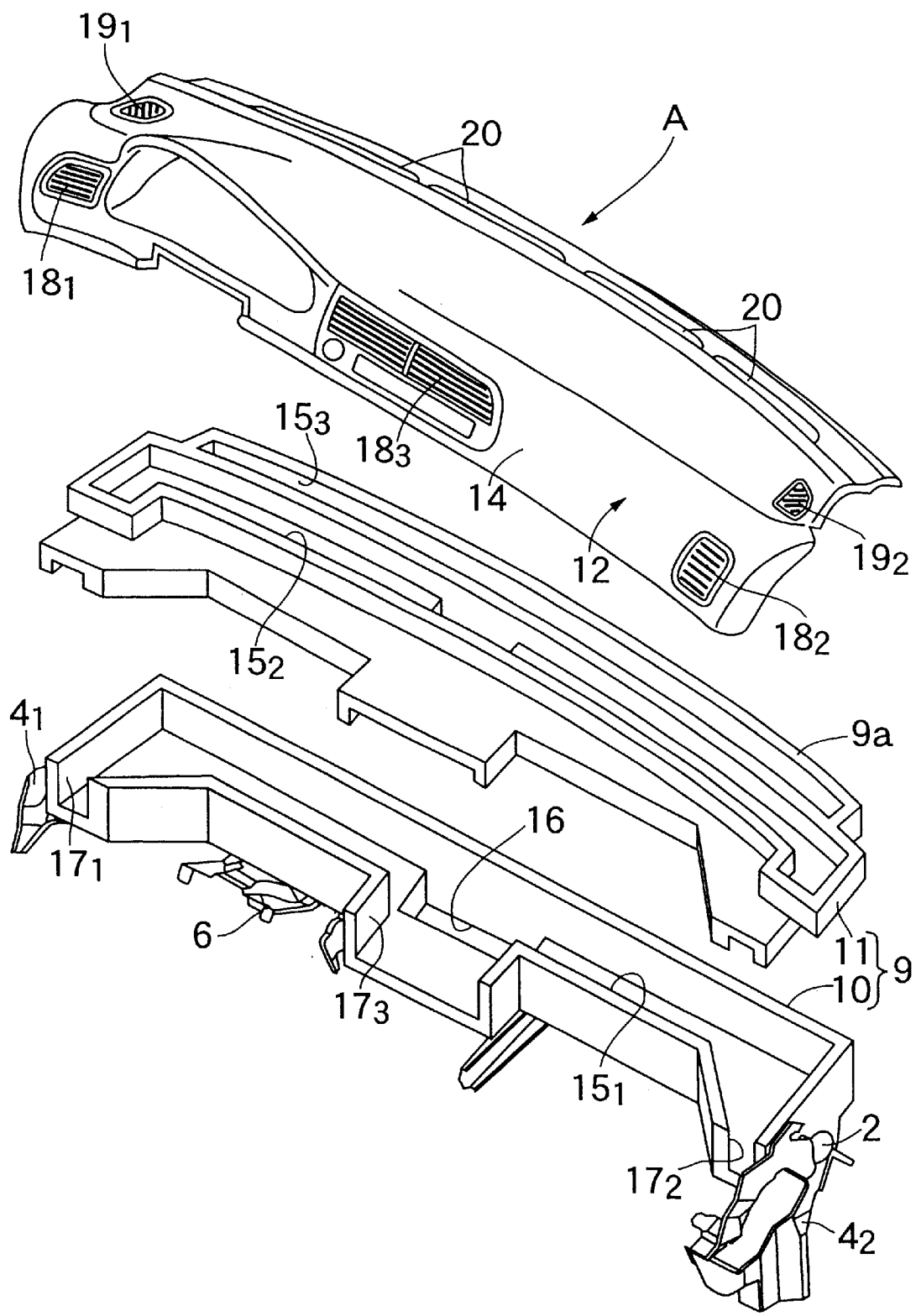
FIG. 2 is an exploded perspective view of an air-conditioning duct to which the above-mentioned steering hanger member is connected and an instrument panel.

Referring first to FIG. 1 and FIG. 2, symbol A denotes an assembly of front interior parts of a motor vehicle which comprises a steering hanger member 1 as a reinforcing member, a box-shaped air-conditioning duct 9 and an instrument panel 12.

The steering hanger member 1 comprises a long axis hanger beam 2 which is made of a steel pipe, a pair of right and left side brackets $4_1$, $4_2$ which are welded to the opposite ends of the above beam, a short axis hanger beam 3 one of whose ends is welded to the left side bracket $4_1$ and which is placed in parallel to the long axis hanger beam 2, a left-side middle stay $5_1$ which joins the other end of the short axis hanger beam 3 to the middle part of the long axis hanger beam 2, a right-side middle stay $5_2$ which is joined to the long axis hanger beam 2 so as to face the stay $5_1$, and a column-mounting bracket 6 which joins the middle part of the short axis hanger beam 3 to the long axis hanger beam 2, wherein the right and left side brackets $4_1$, $4_2$ are individually bolted to right and left front pillars (not illustrated) of the vehicle body, a steering column 24 which axially supports a steering wheel 23 is fixed to the column-mounting bracket 6 and a console-mounting bracket 7 is fixed to the two middle stays $5_1$, $5_2$.

Figure 3:
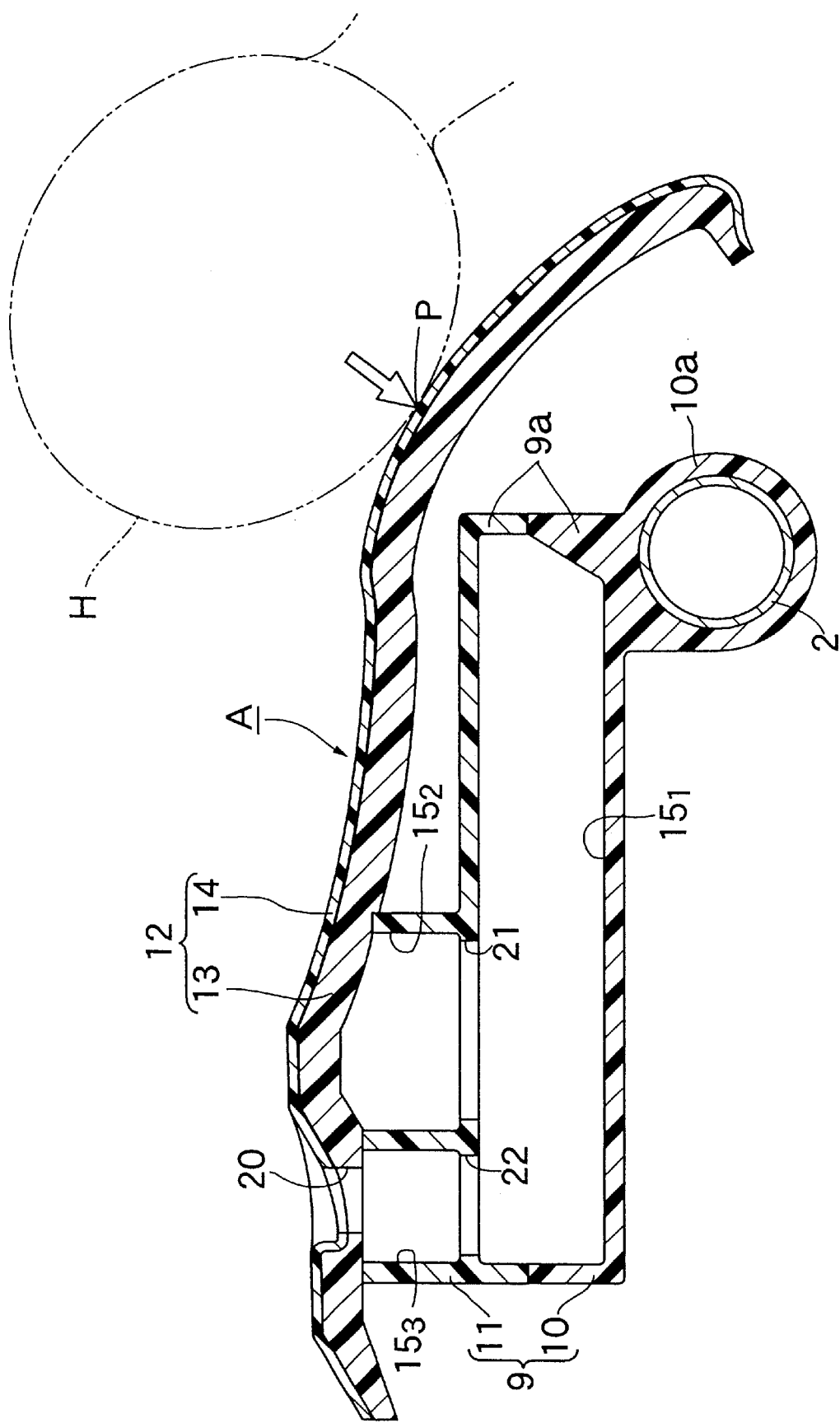
FIG. 3 is a cross-sectional view of the air-conditioning duct to which the above-mentioned steering hanger member is connected.

As shown in FIG. 2 and FIG. 3, the box-shaped air-conditioning duct 9 comprises a lower duct element 10 made of a synthetic resin foam and an upper duct element 11 similarly made of a synthetic resin foam and joined to the top of the above. A supporting boss 10a is formed integrally with the lower duct element 10 using the same material, and is conjoined with the long and short axis hanger beams 2, 3 of the aforementioned steering hanger member 1 along almost all their length while covering their outer surfaces.

The synthetic resin foams forming the lower and upper duct elements 10, 11 are compatible with each other.

The instrument panel 12 comprises a panel body 13 made of a synthetic resin foam which is compatible with the upper duct element 11 and an embossed synthetic resin skin 14 which is bonded to the surface of the panel body 13. More particularly, all synthetic resin foams are based on, for example, an olefin type PP (polypropylene). The lower duct element 10 and the upper duct element 11, and the upper duct element 11 and the panel body 13 of the instrument panel 12 are ultrasonically melt-bonded.

The lower duct element 10 and the upper duct element 11 together define a first airway $15_1$ therebetween which extends laterally of the vehicle and three outlets $17_1$, $17_2$, $17_3$ which protrude from the first airway $15_1$ towards the vehicle interior, and an inlet 16 which opens at a central part of the first airway $15_1$ is formed on the lower duct element 10.

The upper duct element 11 and the panel body 13 together define a second airway $15_2$ and a third airway $15_3$ therebetween which extend from laterally, and holes 21, 22 which communicate the first airway $15_1$ with the second airway $15_2$ and with the third airway $15_3$ respectively are placed on the upper duct element 11.

On the instrument panel 12 there are formed three front vents $18_1$, $18_2$, $18_3$ which are connected to the aforementioned three outlets $17_1$, $17_2$, $17_3$, a pair of right and left side vents $19_1$, $19_2$ which are communicated with the ends of the second airway $15_2$, and multiple top vents 20, 20 . . . which open from the third airway $15_3$ towards the inside surface of the front windshield (not illustrated).

Thus, by connecting the inlet 16 to the outlet duct of an air conditioner and operating it, cool air or warm air can be fed from the inlet 16 into the first, second and third airways $15_1$, $15_2$, $15_3$ and blown out of each of the vents $18_1$, $18_2$, $18_3$; $19_1$, $19_2$; 20, 20 . . .

In order to also use such a box-shaped air-conditioning duct 9 as an energy absorbing member, as clearly shown in FIG. 3, a lengthways wall 9a which becomes the rear wall of the first airway $15_1$ is positioned so as to rise from the supporting boss 10a covering the outer surface of the aforementioned long axis hanger beam 2 and is placed so that it points towards an area P of the instrument panel 12 which is expected to receive an intense impact from the head H of an occupant when the vehicle is involved in a collision. This lengthways wall 9a is formed so that its thickness increases towards its base at which it joins the supporting boss 10a.

The operation of the embodiment having the above arrangement is described below.

Figure 4:
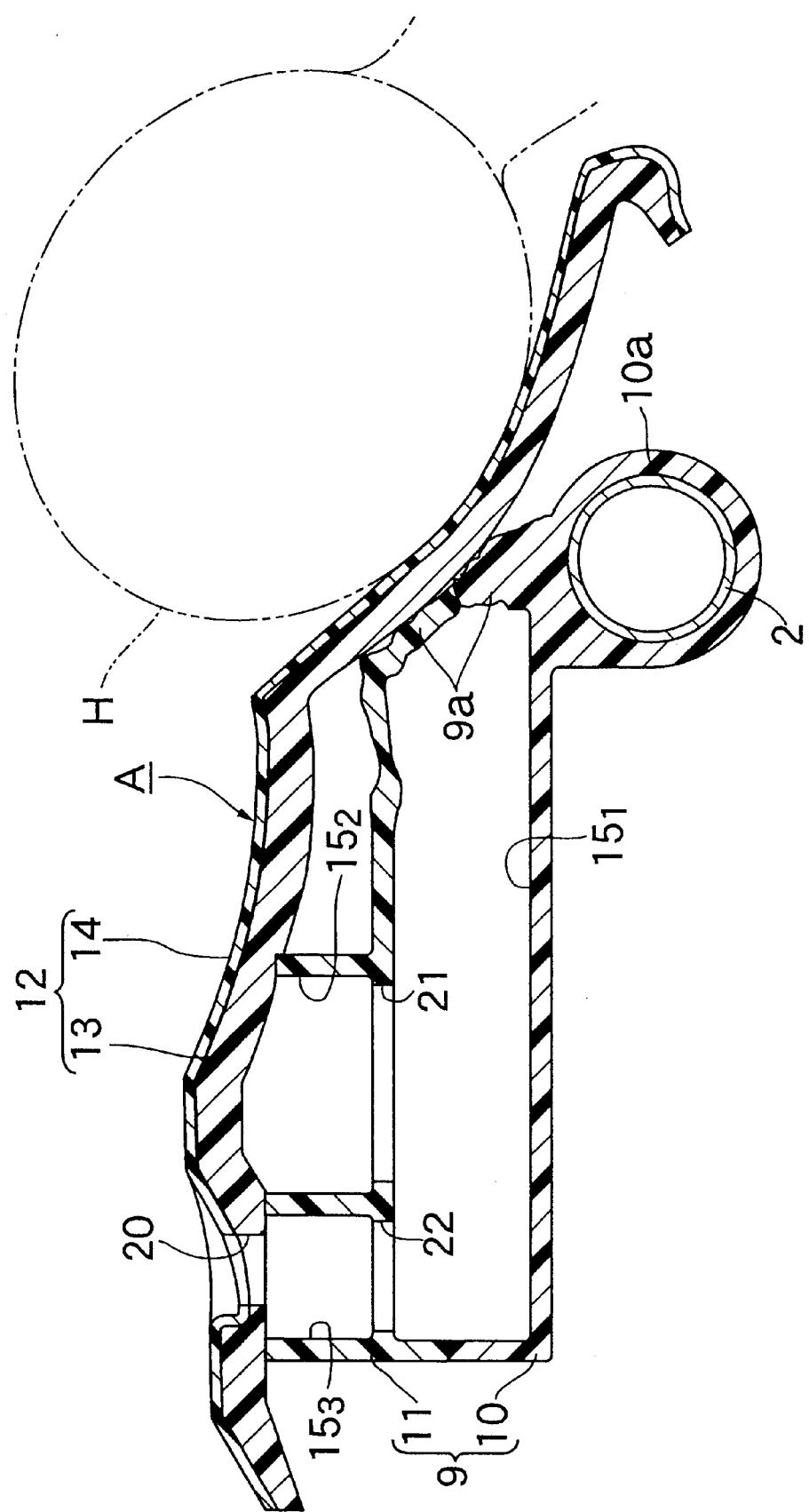
FIG. 4 is an explanatory sketch for the action that occurs when the head of an occupant collides with the instrument panel.

When a vehicle is involved in a collision and receives a large degree of deceleration, an occupant in a front seat of the vehicle might be forced into a forward leaning position and hit the upper surface of the instrument panel 12 with his or her head H. When the head H of the occupant collides with the upper surface of the instrument panel 12, as shown in FIG. 4, a compressive load is applied to the lengthways wall 9a of the box-shaped duct 9 made from a synthetic resin foam while deforming or destroying the instrument panel 12, and the impact energy is absorbed up to a level at which the foamed cells are destroyed and the entire wall is buckled. In this case, by choosing the size of the foamed cells and the thickness and angle of the lengthways wall 9a, the level of energy which can be absorbed can be easily controlled. In particular, as in the present embodiment, by increasing the thickness of the lengthways wall 9a towards its base at which it joins the supporting boss 10a, the level of energy that can be absorbed increases as the destruction progresses, and thus the limited height of the lengthways wall 9a can be effectively used for the absorption of impact energy.

The impact experienced by the occupant can thus be effectively reduced by destroying the foamed cells of the lengthways wall 9a which rises from the steering hanger member 1, and therefore it is possible to place the steering hanger member 1 and the instrument panel 12 close to each other, thereby increasing the freedom of their layout and the capacity of the vehicle interior.

In addition, since the box-shaped air-conditioning duct 9 functions also as an energy absorbing member, it is unnecessary to form a special energy absorbing member and its structure can be simplified.

Furthermore, the supporting boss 10a of the lower duct element 10 is formed around the outer surfaces of the long and short axis hanger beams 2, 3 of the steering hanger member 1, the lower duct element 10 is melt-bonded to the upper duct element 11 and the upper duct element 11 is melt-bonded to the panel body 13 of the instrument panel 12 in turn. The air-conditioning duct 9 and the instrument panel 12 can therefore be supported on the steering hanger member 1 without using screws at all or with only limited use thereof. The number of steps for assembling the front interior part assembly A can thus be greatly decreased resulting in a cost reduction.

Moreover, since the supporting boss 10a of the lower duct element 10 joins the long and short axis hanger beams 2, 3 of the steering hanger member 1 along almost all their length, the air-conditioning duct 9 and the instrument panel 12 can be effectively reinforced by the steering hanger member 1, at the same time the rigidity of the steering hanger member 1 can be strengthened by the air-conditioning duct 9 and the instrument panel 12, and as a result the rigidity between the right and left front pillars of the body and the rigidity of the support for the steering column 24 can be effectively enhanced.

It has been confirmed from test results that the rigidity of a steel pipe having an outer diameter of 60 mm and a thickness of 1.6 mm covered with a PP (polypropylene) foam having an expansion rate of 5 and a thickness of 5 mm is strengthened by 10% in comparison with a steel pipe without such a cover.

In particular, the supporting boss 10a can have a large thickness in comparison with a non-foamed synthetic resin of the same material and weight; when this is used to cover the outer surfaces of the long and short axis hanger beams 2, 3, the section modulus can be increased by enlarging the outer diameter of the supporting boss 10a and thus the rigidity of the long and short axis hanger beams 2,3 can be effectively strengthened.

Moreover, since the supporting boss 10a has a specific gravity far smaller than that of a steel pipe, the increase in weight due to the covering of the supporting boss 10*a* is smaller than that when the outer diameter or thickness of the steel pipe forming the long and short axis hanger beams 2,3 is increased.

Since the instrument panel 12 is formed to define the above second and third airways 15₂, 15₃ in the space formed between it and the upper duct element 11 which is melt-bonded to the panel body 13 thereof it also functions, together with the upper duct element 11, as one half of the pair which make the duct, thus contributing to the simplification of the structure of the multiple airway air-conditioning duct.

Furthermore, since the panel body 13 of the instrument panel 12, the upper duct element 11 and the lower duct element 10 are formed from synthetic resin foams which are compatible with each other, the melt-bonding thereof can be carried out easily and reliably, and thus the air-conditioning duct 9 having good heat insulation can be provided inexpensively.

The present invention is not limited to the above-mentioned embodiment and can be modified in a variety of ways without departing from the spirit and scope of the invention. For example, the lower duct element 10 and upper duct element 11 may be formed as a single component. Furthermore, in the case of the embodiment illustrated in the drawings, an appropriate gap is formed between the lengthways wall 9*a* and the reverse surface of the instrument panel 12, but there may be no gap and the lengthways wall 9*a* may be in contact with the reverse surface of the instrument panel 12.

What is claimed is:

1. A supporting structure for an instrument panel of a motor vehicle, comprising an instrument panel made of a synthetic resin and supported by a reinforcing member which is linked to a body of the motor vehicle, and an energy absorbing member made of a foamed synthetic resin, placed between a reverse surface of said instrument panel and the reinforcing member and disposed apart from the instrument panel wherein, when a head of an occupant collides with an upper surface of said instrument panel, the collision energy causes the instrument panel to collide with and collapse said energy absorbing member, thus the collision energy is absorbed by destroying foamed cells of said energy absorbing member as said instrument panel is deformed or destroyed.

2. A supporting structure for an instrument panel of a motor vehicle according to claim 1, wherein said energy absorbing member comprises a box-shaped air-conditioning duct.

3. A supporting structure for an instrument panel of a motor vehicle according to claim 2, wherein said reverse surface of said instrument panel has an area expected to receive an intense impact from the head of the occupant and said box-shaped air-conditioning duct includes a lengthways wall which rises towards said area from said reinforcing member.

* * * * *